June 1, 1937.  A. J. GRANBERG  2,082,391
SETTING MEANS FOR AUTOMATIC METER SHUT-OFFS
Original Filed Dec. 26, 1934
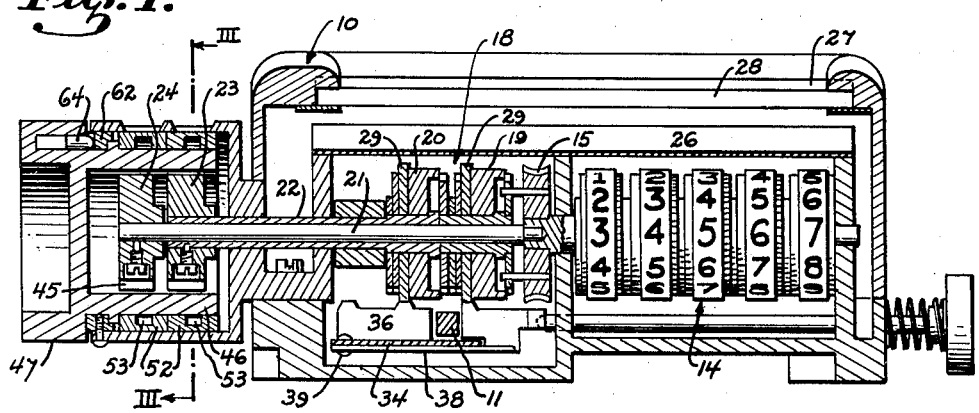
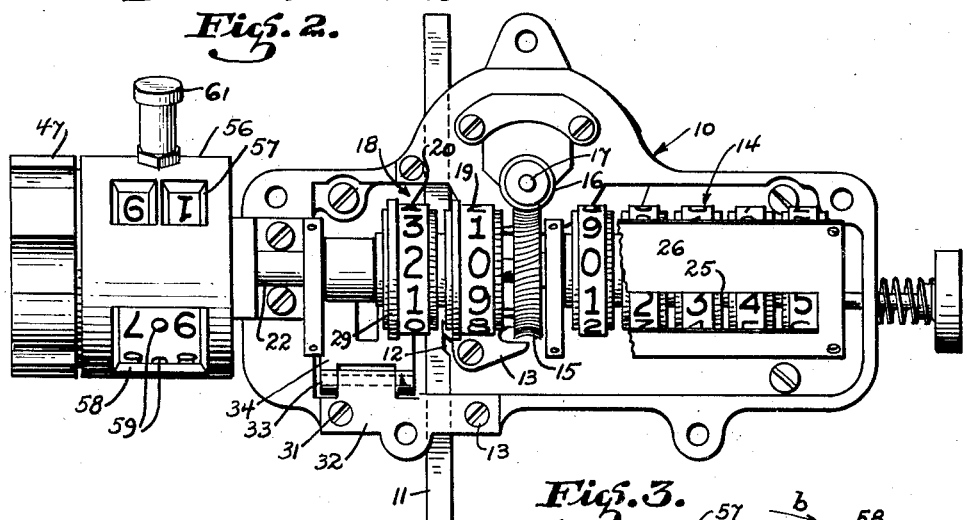
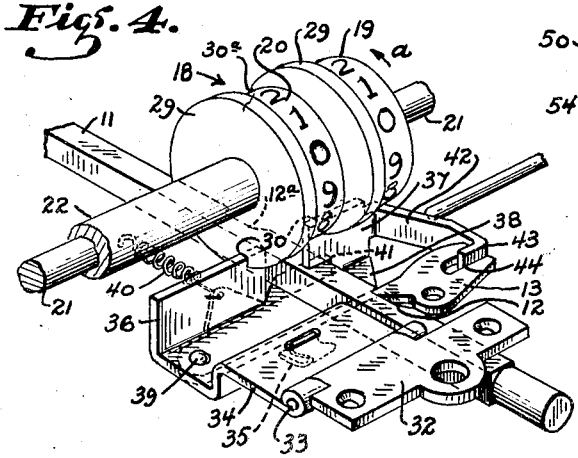
INVENTOR.
Albert J. Granberg.
BY
Townsend & Loftus.
ATTORNEYS.

Patented June 1, 1937

2,082,391

UNITED STATES PATENT OFFICE 2,082,391

SETTING MEANS FOR AUTOMATIC METER SHUT-OFFS

Albert J. Granberg, Berkeley, Calif., assignor to Ralph N. Brodie Company, Oakland, Calif., a corporation of California Application December 26, 1934, Serial No. 759,201
Renewed October 23, 1936

2 Claims. (Cl. 221—101)

This invention pertains to liquid meters and shut-off valves controlled by the operation of the meters, and relates particularly to mechanism for setting the meter quickly and accurately to cause the valve to close when a predetermined quantity of liquid has been metered, said mechanism being effective to reset the meter repeatedly for the same quantity so that it will be unnecessary for the operator to exercise caution in setting and impossible to make an error in the resetting operation.

In my co-pending applications entitled "Automatic shut-off for meter", filed August 2, 1933, Serial Number 683,313 and "Automatic shut-off for meters", filed February 26, 1934, Serial Number 712,887, I have disclosed a meter and valve combination in which a spring closed valve is maintained open by mechanism associated with the meter. In these disclosures when the meter has attained a predetermined reading, the said mechanism releases the valve, permitting it to close under the influence of its spring.

In each of my said co-pending applications I disclosed a meter, including an auxiliary counting mechanism operating with the conventional counter and capable of being set to represent the volume of liquid to be delivered. Finger wheels, disposed exteriorly of the meter casing, are employed to set the auxiliary counter dials to the desired reading. When the indicated volume of liquid has been delivered, the valve is permitted to close.

Where it is desired to fill great quantities of containers of uniform size, such, for example, as five-gallon cans, or barrels of ten, twenty-five or fifty gallon capacity, it is desirable to enable resetting with a minimum amount of manipulation of setting mechanism and without the necessity of observation of the auxiliary counter dials. This expedites the filling operations and eliminates errors in the frequent resetting.

The object of the present invention, therefore, is to provide an automatic shut-off for meters which enables setting the shut-off mechanism at a desired reading and which permits repeatedly resetting to the same reading without the necessity of manipulating more than one setting member and without the need of observing the reading at each setting to insure its accuracy.

One form of my invention is exemplified in the accompanying drawing and further of its objects and advantages are made apparent in the accompanying specification, wherein reference is made to the drawing.

In the drawing:

Fig. 1 is a central, vertical, longitudinal section of a meter counting mechanism embodying my invention.

Fig. 2 is a plan view of the same, with the upper portion of the casing removed and parts broken away.

Fig. 3 is a sectional view taken on the line III—III of Fig. 1.

Fig. 4 is a perspective view of the mechanism employed to release the shut-off valve.

In the drawing I show a counting mechanism suitably arranged in a casing 10, which casing is preferably arranged adjacent to, and supported by, a meter (not shown). The casing 10 also contains means for retaining a spring closed shut-off valve in an open position until a predetermined volume of liquid has passed through the meter and has been registered upon the counting mechanism.

This is accomplished by a sliding bar 11 extending through the casing 10 and connected by means (not shown) to the shut-off valve, as fully set forth in my co-pending applications above referred to. When the valve is opened the sliding bar 11 is caused, by the said connections, to slide through the casing 10. Means within the casing lock the rod in a position holding the valve open and, therefore, fluid continues to flow through the meter and valve until the locking means is released, at which time the valve closes under the tension of its spring.

A preferred structure for holding the valve in its open position is illustrated in Fig. 4, wherein the sliding rod 11 is shown as provided with a notch 12, which notch is engaged by a pivoted pawl 13 to retain the rod in its innermost position and hold the valve open until the pawl 13 is released from the notch 12. The mechanism for effecting this release is contained within the casing 10 and is actuated by movement of the counting mechanism which is driven by the meter.

Referring to Figs 1 and 2, the casing is shown as containing a counting mechanism, generally indicated at 14. This counting mechanism is of conventional design and comprises a plurality of dial wheels, numbered on their exterior surfaces to represent gallons or other units of volumetric measure that have passed through the meter. One of the dial wheels is positively driven through a central shaft (not shown), which shaft is rotated by a worm gear 15, in mesh with a worm 16 fixed to a shaft 17 which is rotated by operation of the meter and extends from the interior of the meter into the casing 10 of the counting mechanism. The positively driven dial wheel is connected by a suitable star-wheel mechanism with the next dial wheel so that upon each complete rotation of the first wheel the second wheel is caused to rotate the distance between adjacent numbers on its exterior surface. The third wheel is similarly connected with the second wheel, and so on, so that the counting mechanism totalizes the number of gallons that have been measured by the meter.

Also arranged within the casing 10 and disposed in axial alignment with the counting mechanism 14 is an auxiliary counter, generally indicated at 18. The auxiliary counter comprises dial wheels 19 and 20. The dial wheel 19 is fixed to a central shaft 21, while the dial wheel 20 is supported by a hollow shaft 22 concentric with the shaft 21 and rotatable with relation thereto. The outer ends of the shafts 21 and 22 are fitted with notched setting wheels 23 and 24, so that the dial wheels 19 and 20 may be rotated independently to cause them to indicate any desired volume of liquid. When the meter is in operation, the auxiliary counter 18 operates in the same manner as the conventional counter 14, the auxiliary counter being driven by means of suitable connection with the worm gear 15, as fully set forth in my co-pending application Serial Number 683,313 mentioned above.

The numerals on the dial wheels of the auxiliary counter are arranged in reverse order with respect to the numerals on the conventional counter. Therefore, if it is desired to deliver nineteen gallons of gasoline through the meter, the setting wheels 23 and 24 are manipulated to position the dial wheels of the auxiliary counter with the numerals "1" and "9" visible through a sight opening 25 in a plate 26 which overlies the counting mechanism (see Fig. 2). A window 27, provided with glass 28, is formed in the casing directly above the plate 26.

With the dial wheels of the auxiliary counter set to read "19" the counting mechanism begins to operate upon the opening of the valve and the flow of liquid through the meter. As the numbers on the dial wheels are arranged in reverse order they will gradually approach a reading of "0". Means are provided to effect a release of the pawl 13 from its engagement with the notch 12 in the sliding bar 11 when the "0" reading is attained, thus permitting closing of the valve when the desired volume of liquid has been metered.

In my co-pending applications above referred to the auxiliary counter is shown as provided with three dial wheels. The present device is intended for delivering smaller quantities and, therefore, only two dial wheels are necessary. It will appear, however, as the description proceeds that three or more such wheels could be employed, if desirable, by simply duplicating certain parts of the structure. The means for accomplishing the release of the pawl 13 are best illustrated in Figs. 2 and 4 of the drawing. In Fig. 4 each of the dial wheels is shown as provided with a disk 29. These disks are fixed to the dial wheels for rotation therewith and each is provided with a peripheral notch 30, so located that it will assume a downward position when the "0" on the dial wheel is displayed through the sight opening 25. Thus, when each of the dial wheels is in a position to display the "0", the notches 30 will be in alignment along the lower edges of the disks 29.

Fixed within the casing and secured thereto by screws 31 (see Fig. 2) is a plate 32, supporting a pintle 33 upon which a plate 34 is carried for swinging movement in a vertical direction. The plate 34 is normally urged upwardly by a spring 35, disposed between it and the bottom of the casing, and is provided with an upturned edge 36 which rides on the periphery of the disks 29 and is adapted to be received by the notches 30 thereof when the dials register "0". The edge 36 is of a length sufficient to engage only the first of the disks 29. The edge of the other disk, however, is engaged by an upturned member 37, carried by a plate 38, which plate underlies the plate 34 and is pivoted thereto by a pin 39. A spring 40 extends between the plate 38 and the casing wall and tends to move the plate 38 and member 37 rearwardly. A lug 41, formed on the plate 34, limits this rearward movement at a point maintaining the member 37 in alignment with the upturned edge 36.

Referring to Fig. 4 the rotation of the dial wheels is in the direction of the arrow $a$, and when both of the dial wheels register "0", the plate 34 swings upwardly about the pintle 33 until the edge 36 thereof is received by the notch 30 in the first disk 29 and the member 37 is likewise received by the notch in the second disk. The valve being open and the meter in operation, the second or right-hand dial wheel tends to continue its rotary motion in the direction of the arrow $a$. Such motion is transmitted by means of the notch 30 in the disk 29 and member 37 to swing the plate 38 about its pivotal support 39. An arm 42 is carried by the member 37 and has its end 43 shaped to engage a notch 44 in the pawl 13. Consequently, this swinging movement of the plate 38 causes pivoting of the pawl, thereby releasing its engagement with the notch 12 in the rod 11. When this release is effected, the rod 11 is free to slide through the housing of the counting mechanism and the shut-off valve is closed by the action of its spring.

If desired, an additional notch may be provided, as at 30$a$, in the last dial wheel and an extra notch 12$a$ in the sliding bar 11 for causing a preliminary partial closing of the valve to reduce the shock or hammer resulting from its final closing action, as set forth in detail in my co-pending application Serial Number 712,889 referred to above.

In order to set the auxiliary counting mechanism to a desired reading, the setting wheels 23 and 24 are rotated to cause rotation of the dials with which they are connected. Each of the setting wheels is provided with a notch 45, as illustrated in Fig. 3. A cylindrical barrel 46 surrounds the setting wheels and is provided at its outer end with a fluted operating handle 47. The barrel 46 is provided with a pair of slots, one of which is shown at 48 in Fig. 3, and each of which receives a pawl 49 pivoted on a pin 50 and pressed at one end by a spring 51 to urge its opposite end inwardly of the barrel and into engagement with the periphery of the setting wheel where, upon rotation of the barrel in the direction of the arrow $b$ (see Fig. 3), it will engage with the notch 45 and thereupon impart rotation to the setting wheel. Thus, when the handle 47 is rotated, both of the setting wheels will be rotated and, likewise, both of the dials 19 and 20 of the auxiliary counter until such time as the pawls 49 are released from their engagement with the notches 45 in the setting wheels.

The mechanism for releasing the pawls from the setting wheels when the dials have reached a predetermined reading is also illustrated in Figs. 1 and 3 and includes a pair of interiorly grooved collars 52, surrounding the barrel 46, with their grooves 53 arranged to receive a protruding lug 54 on each of the pawls. A trip pin 55 is arranged transversely of each of the grooves 53 and is positioned to intercept the lug 54 on the pawl, thus causing the pawl to be disengaged from the notch 45. The position of the trip pin 55 may be adjusted to trip the pawl at any point in its circular path of travel by manipulating the collars 52, which collars are free to revolve on the barrel 46.

Thus if it is desired to set the auxiliary collar at 19, one of the collars 52 is revolved until its trip pin 55 assumes a position to trip the pawl 49 when the dial wheel reads "9" and the other collar is adjusted so that its pin will trip the pawl when the dial reads "1". The external peripheries of the collars 53 are numbered to correspond with the numbering on the dial wheels and a cylindrical housing 56 encloses the collars and is provided with windows 57, as shown in Fig. 2, through which the chosen numbers may be viewed. Larger windows, as illustrated at 58, are also provided in opposite sides of the housing 56 to provide space for the operator to grasp and rotate the collars. The abutting edges of the collars 52 are provided with spaced, semi-circular notches which register with each other to form spaced circular holes 59 when two numerals are in register with the windows 57 and a spring-pressed detent 60 fits into these holes to lock the collars in their adjusted position. A handle 61 is provided for withdrawing the detent 60 when the reading is to be changed. An annular washer 62 (Fig. 1) may be held in the end of the housing 56 to form a bearing surface for a spring-pressed button 64 which will overcome any tendency of the barrel 46 to move in an axial direction.

In the operation of the device let it be assumed that a number of small containers are to be filled and that it is desired that exactly nineteen gallons be placed in each container. The operator first releases the detent 60, and then revolves the collars 52 until the reading "19" appears through the window 57, as shown in Fig. 2. This reading must be viewed from the rear side of the counter, due to the fact that the position of the setting wheels 23 and 24 is reversed with respect to the position of the auxiliary counter dials 19 and 20. With the collars so adjusted, the operating handle 47 is rotated, the pawls 49 engage the notches in the setting wheels, and the counter dials are rotated. When dial 19 displays the figure "9" the pawl 49, controlling the operation of that dial, is tripped by the pin 55. Likewise, when the dial 20 displays the figure "1", its pawl is tripped. Further rotation of the operating member 47 will then have no effect and the increased freedom of its movement will indicate to the operator without the necessity of his even looking at the dial that the counter is properly set to measure nineteen gallons before permitting closing of the shut-off valve. When the nineteen gallons has been delivered into the container, the shut-off valve is automatically closed and it is only necessary to again rotate the operating member 47 before opening the valve to fill the next container.

With the device described above, it is possible for an operator to fill any number of containers, putting exactly the same quantity of fluid into each without the necessity of carefully resetting the predetermining counter and without any possibility of error in the setting operation.

While I have shown a preferred form of my invention, it will, of course, be understood that various changes may be resorted to in the construction and arrangement of its several parts within the scope of the appended claims.

Having thus described my invention, what I claim and desire to secure by Letters Patent is:

1. In a device of the character described, a counting mechanism comprising a plurality of calibrated dials, means for setting said dials to any desired reading comprising a rotatable member connected with each dial, means for repeatedly setting the dials to the same reading comprising a rotatable barrel surrounding said rotatable members, pawls carried by said barrel for engagement one with each of said rotatable members to cause them to rotate when the barrel is rotated, and trip means capable of adjustment to trip said pawls at any desired point in their cycle of rotation.

2. In a device of the character described, a counting mechanism comprising a plurality of calibrated dials, means for setting said dials to any desired reading comprising a rotatable member connected with each dial, means for repeatedly setting the dials to the same reading comprising a rotatable barrel surrounding said rotatable members, pawls carried by said barrel for engagement one with each of said rotatable members to cause them to rotate when the barrel is rotated, a grooved collar surrounding the barrel for each pawl and receiving a part of the pawl in its groove, a trip pin in the groove of each collar to engage and trip the pawl, calibrations on the exterior of said collars coresponding to the calibrations on the said dials, said collars being rotatable, and means to secure the collars in an adjusted position whereby the trip pins will be effective upon rotation of the barrel to cause the reading on the dials to agree with the reading on said collars.

ALBERT J. GRANBERG.